(12) United States Patent
Meyers

(10) Patent No.: US 8,313,120 B2
(45) Date of Patent: Nov. 20, 2012

(54) MULTI-PIECE STEERING-COLUMN COVER

(75) Inventor: Ron Meyers, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1027 days.

(21) Appl. No.: 11/962,814

(22) Filed: Dec. 21, 2007

(65) Prior Publication Data

US 2009/0158880 A1 Jun. 25, 2009

Related U.S. Application Data

(60) Provisional application No. 60/878,421, filed on Dec. 31, 2006.

(51) Int. Cl.
*B62D 1/00* (2006.01)

(52) U.S. Cl. .......................................... 280/771; 74/493

(58) Field of Classification Search .................. 280/771, 280/775, 779, 777; 74/492, 463, 493; 296/70; D12/174, 177, 190, 192, 176; 180/90
See application file for complete search history.

(56) References Cited

U.S. PATENT DOCUMENTS

| | | | | |
|---|---|---|---|---|
| 3,518,895 | A | * | 7/1970 | Crossman et al. ............... 74/493 |
| 4,142,423 | A | * | 3/1979 | Ikawa .............................. 74/492 |
| 4,781,268 | A | * | 11/1988 | Richardson, Jr. ............. 180/287 |
| 6,892,843 | B2 | * | 5/2005 | Schillaci et al. ........... 180/69.21 |
| 7,000,949 | B2 | | 2/2006 | Bostic et al. |
| 7,055,860 | B2 | | 6/2006 | Armstrong et al. |
| 7,077,027 | B2 | * | 7/2006 | Krizan et al. .................... 74/493 |
| 7,077,431 | B2 | * | 7/2006 | Gayer et al. ................... 280/775 |
| RE39,440 | E | * | 12/2006 | Anspaugh et al. .......... 74/606 R |
| 2004/0090058 | A1 | | 5/2004 | Yamamoto |
| 2004/0108704 | A1 | | 6/2004 | Shibayama |
| 2005/0151361 | A1 | | 7/2005 | Hori et al. |
| 2007/0296194 | A1 | * | 12/2007 | Ridgway et al. .............. 280/775 |

FOREIGN PATENT DOCUMENTS

JP 2-38179 * 2/1990

* cited by examiner

*Primary Examiner* — Eric Culbreth
(74) *Attorney, Agent, or Firm* — Mark Duell; Emerson Thomson Bennett

(57) ABSTRACT

The present invention generally relates to articles for masking internal components of a motor vehicle steering column from the view of an occupant when the steering wheel is titled, or extended. Some embodiments relate to methods for making or using masking articles, or to methods for masking the internal components of a motor vehicle steering column when the steering wheel is titled, or extended.

16 Claims, 6 Drawing Sheets

MULTI-PIECE STEERING-COLUMN COVER

CROSS-REFERENCE TO RELATED APPLICATIONS

This application claims priority to Provisional Patent Application No. 60/878,421 filed Dec. 31, 2006 now pending and incorporated herein by reference in its entirety.

BACKGROUND OF THE INVENTION

1. Field of the Invention

The present invention generally relates to articles for masking internal components of a motor vehicle from the view of an occupant. Some embodiments relate to a member of a steering column housing.

2. Description of Related Art

Blind members are known in the art for concealing steering column components from the view of an occupant of a motor vehicle. However, prior blind members are usually made from rubber materials that are compressed during operations such as tilting or retracting the steering wheel. Compression of such materials can result in permanent plastic deformations the cause the blind to lose its functionality. For instance, a permanently compressed blind would expose components of a steering column when the steering wheel is tilted downward or extended outward. Furthermore, some prior blind members move with the steering wheel when the wheel is extended outward (e.g. by telescoping), which can result in exposing the components that it is supposed to conceal.

Accordingly, there is a need in the art for a blind member that does not expose the components of the steering column when extended or tilted. Furthermore, there is a need for a blind member that does not permanently deform under operating conditions.

BRIEF SUMMARY OF THE INVENTION

Some embodiments relate to an article, comprising: a shaft portion having a semicircular cross section and defining a shaft radius; a blind portion having a semicircular cross section and defining a blind radius that is larger than the shaft radius; and a means for mounting the article to a non-rotatable and non-telescoping portion of a steering column in a fixed relation, wherein the steering column has a rotatable telescoping portion and a non-rotatable non-telescoping portion.

Another embodiment relates to a process for masking components, comprising the steps of: providing a masking device adapted to obstruct a view of one or more components; and mounting the masking device to a non-rotatable and non-telescoping portion of a steering column.

Still another embodiment relates to a means for obstructing the view of one or more automobile components by an occupant of the vehicle.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF ILLUSTRATIVE EMBODIMENTS

Figure 1A:
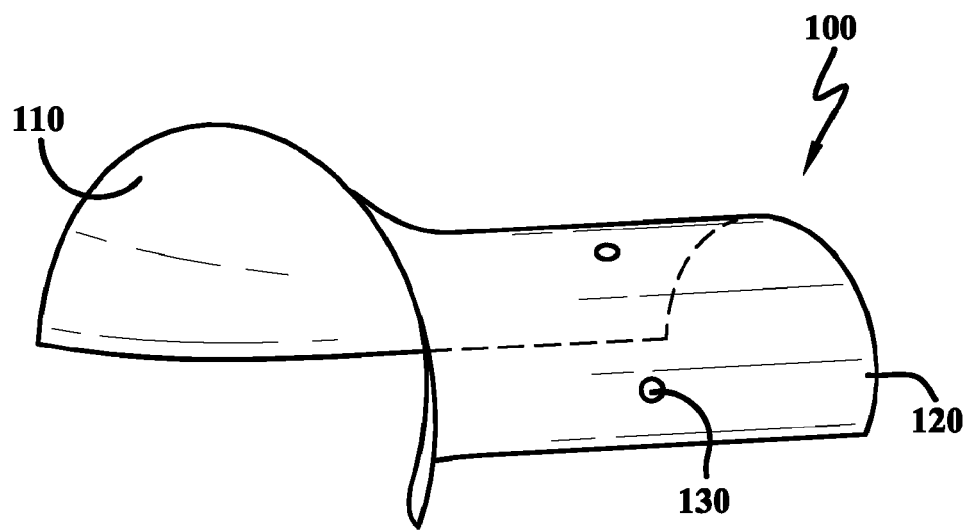
FIG. 1A is a drawing of an embodiment comprising a cylindrical shaft and a flared obstructing portion.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

In some embodiments, a steering column housing includes a member that masks internal component from the view of occupants of a motor vehicle. According to some embodiments the member functions as a blind. The blind can be attachable to a portion of a steering column. For example, in some embodiments the blind can be attached to a non-rotatable and/or non-telescoping portion of the steering column. Accordingly, the blind does not rotate and/or telescope with the steering wheel. However, in some embodiments used in connection with tiltable steering columns, the blind can tilt with the steering wheel.

In other embodiments the blind can be attachable to a rotatable portion of a steering column. In such embodiments, the blind is rotatable with the steering wheel. Furthermore, in embodiments used in connection with tiltable steering columns, the blind can tilt with the steering wheel. However, in such embodiments the blind does not telescope with the steering wheel.

In some embodiments a blind comprises a shaft portion. The shaft portion can have a variety of cross sectional shapes. An appropriate shape can be selected based on the nature of the components that the blind covers or houses, desired aesthetic factors, and other factors that will be understood by those skilled in the art. Some acceptable shapes include any of the following: circular, elliptical, hyperbolic, or irregular. Furthermore, some acceptable shapes comprise a complex combination of a plurality of basic shapes.

According to some embodiments, the shaft portion of the blind can include one or more attachment points for attaching the blind to the steering column. For example, in some embodiments the shaft portion defines one or more through-holes that are adapted to receive a fastener such as a screw, bolt, rivet, or the like. Furthermore, in some embodiments the shaft portion can include one or more clips, clasps, snaps, latches, or the like for attaching the blind member to the steering column.

In some embodiments the blind member also includes an obstructing portion. The obstructing portion serves to block the line of sight of a viewer. Any of a variety of specific structures that perform this function can be suitable as an obstructing portion. Some acceptable structures include a flare, flange, rim, wheel, torus, washer, wafer, or any combination thereof. In some embodiments the obstructing portion and the shaft portion can comprise a single part. In other embodiments, the obstructing portion and the shaft portion can comprise separate parts that are assembled to form the blind member.

Turning now to the figures, FIG. 1 is a group of drawings showing embodiments having a variety of geometries. In FIG. 1A an embodiment 100 has a straight cylindrical shaft portion 120 and a flared obstruction portion 110. The embodiment 100 has a semi-circular cross section. Accordingly, the embodiment 100 is adapted to mount to less than the entire circumference of a steering column. The embodiment 100 also includes a plurality of holes 130 adapted to receive fasteners for mounting the embodiment 100 to a steering column.

Figure 1B:
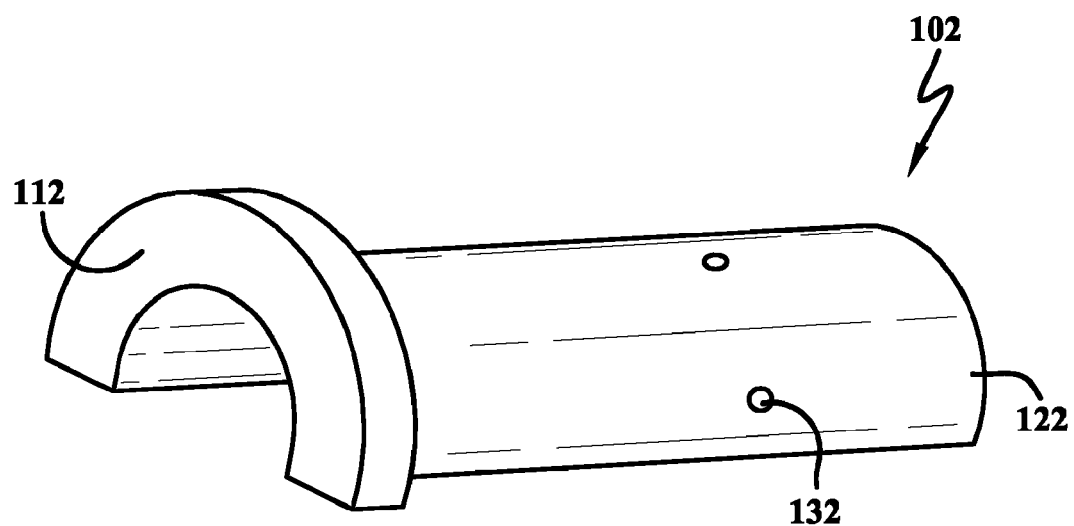
FIG. 1B is a drawing of an embodiment comprising a cylindrical shaft and a flanged obstructing portion.
Figure 1C:
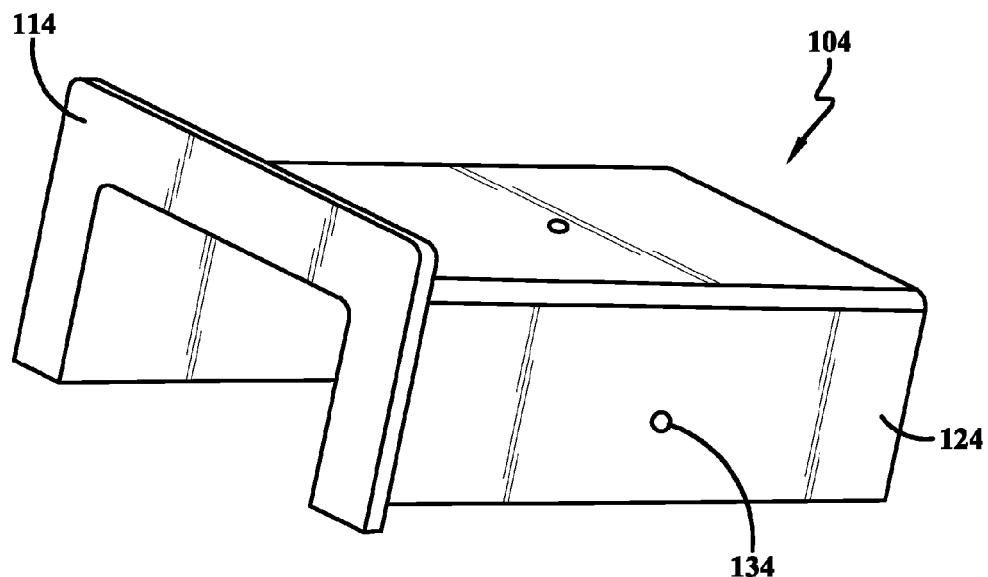
FIG. 1C is a drawing of an embodiment comprising a square shaft having rounded edges and a flanged obstructing portion.

FIG. 1B shows an embodiment 102 having a cylindrical shaft portion 122, a flanged obstruction portion 112, and a plurality of fastener holes 132. This embodiment also has a semi-circular cross section. Accordingly, the embodiment 102 is also adapted to mount to less than the entire circumference of a steering column. FIG. 1C shows an embodiment 104 having a semi-rectangular cross section where the rectangle has rounded corners. Accordingly, the shaft portion 124 has the shape of an elongate rectangular tube having rounded corner. In this embodiment 104 the obstruction portion 114 comprises a flange having a similarly semi-rectangular shape. Furthermore, this embodiment also includes fastener holes 134 for mounting the embodiment 104 to a steering column.

Figure 1D:
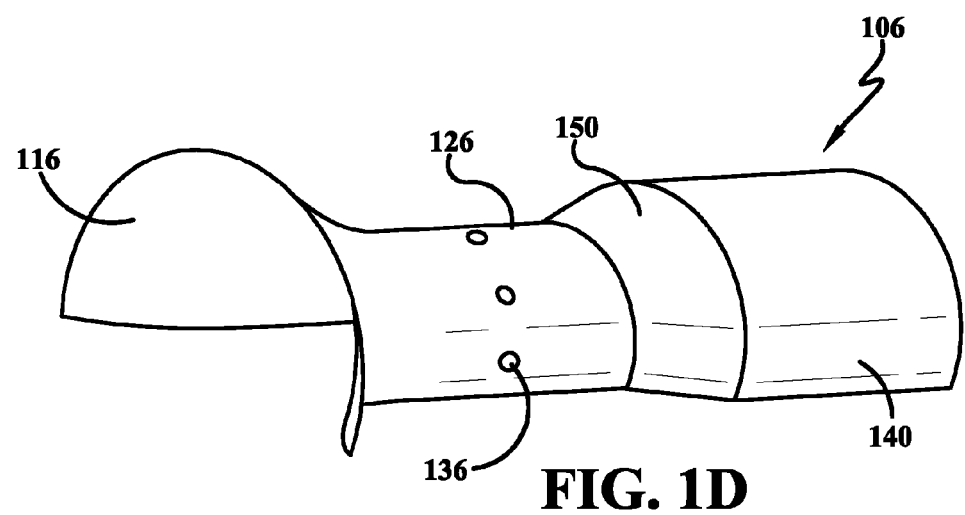
FIG. 1D is a drawing of an embodiment comprising a two-stage cylindrical shaft having two distinct radii, and a flared obstructing portion.

Finally, FIG. 1D shows an embodiment 106 comprising a complex shape. The shaft portion includes a smaller shaft portion 126 and a larger shaft portion 140 joined by a conical region 150. This or another complex shape may be desirable in some applications. For example, the steering column to which the embodiment mounts may have a complex shape to which the embodiment must conform. The cross sectional shape of this embodiment 106 comprises a semi-circle. The obstruction region 116 comprises a flared shape. The embodiment also includes a plurality of fastener holes 136 for mounting the embodiment 106 to a steering column.

One of skill in the art will recognize that a wide variety of shapes and combinations of shapes of the obstructing and shaft portions can be acceptable. The appropriate shape will be selected according to needs of the specific application. For example, some irregularly shaped steering columns may require a complex or irregularly shaped blind member. One of skill in the art will be able to select the appropriate shape or combination of shapes without undue experimentation.

Figure 2:
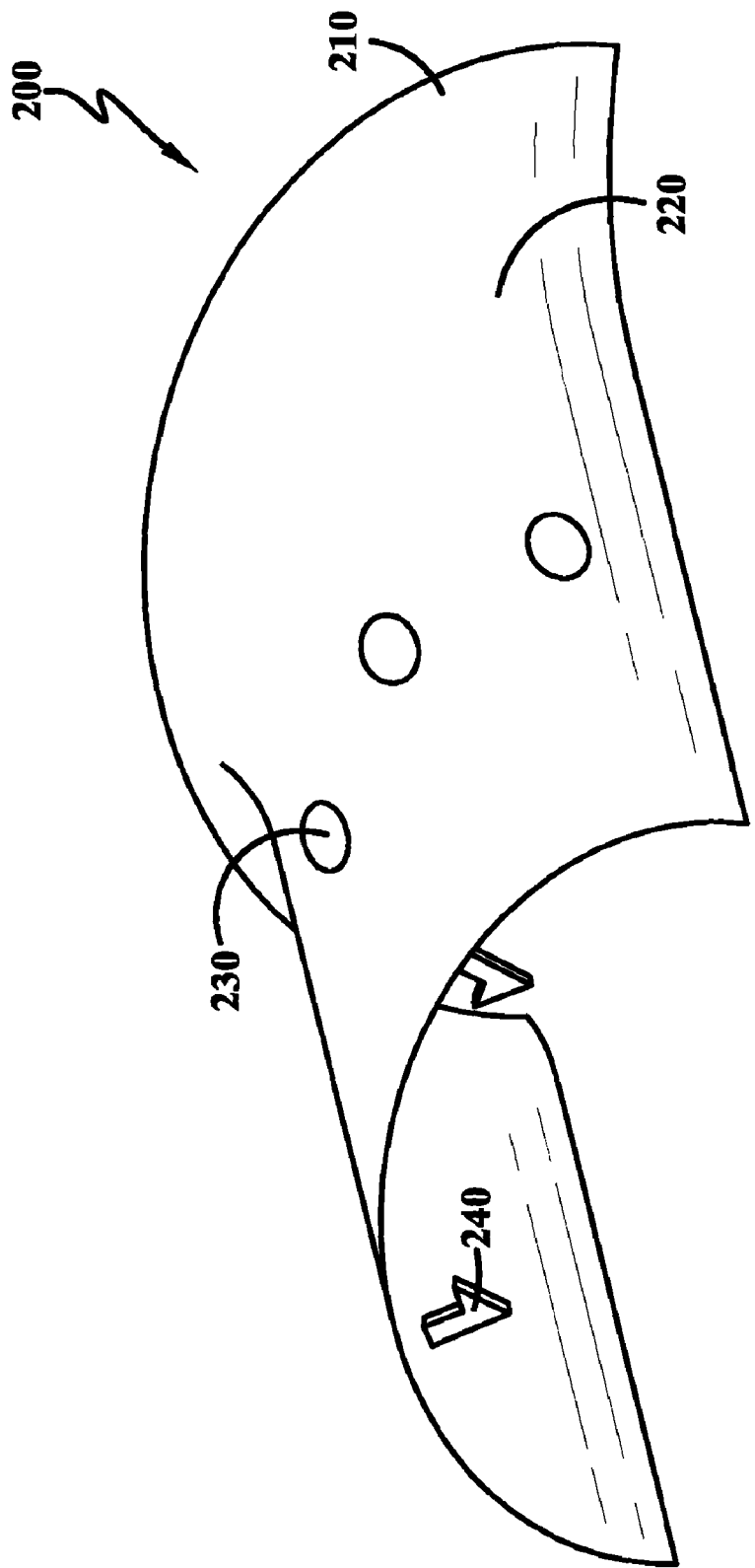
FIG. 2 is a plan view of an embodiment having both fastener holes and male clips.

FIG. 2 shows an embodiment similar to the one set forth in FIG. 1A. In FIG. 2, the embodiment 200 is viewed from the end of the shaft portion 220 that opposes the obstructing portion 210. The embodiment 200 includes a plurality of fastener holes 230 as well as a pair of male clips 240. The male clips 240 can be used to mount the embodiment 200 to a steering column. Furthermore, some embodiments can include the clips 240, but not include fastener holes 230. One of skill in the art will recognize that a variety of means for mounting the blind member to a steering column can be appropriate depending on the specific application.

Figure 3:
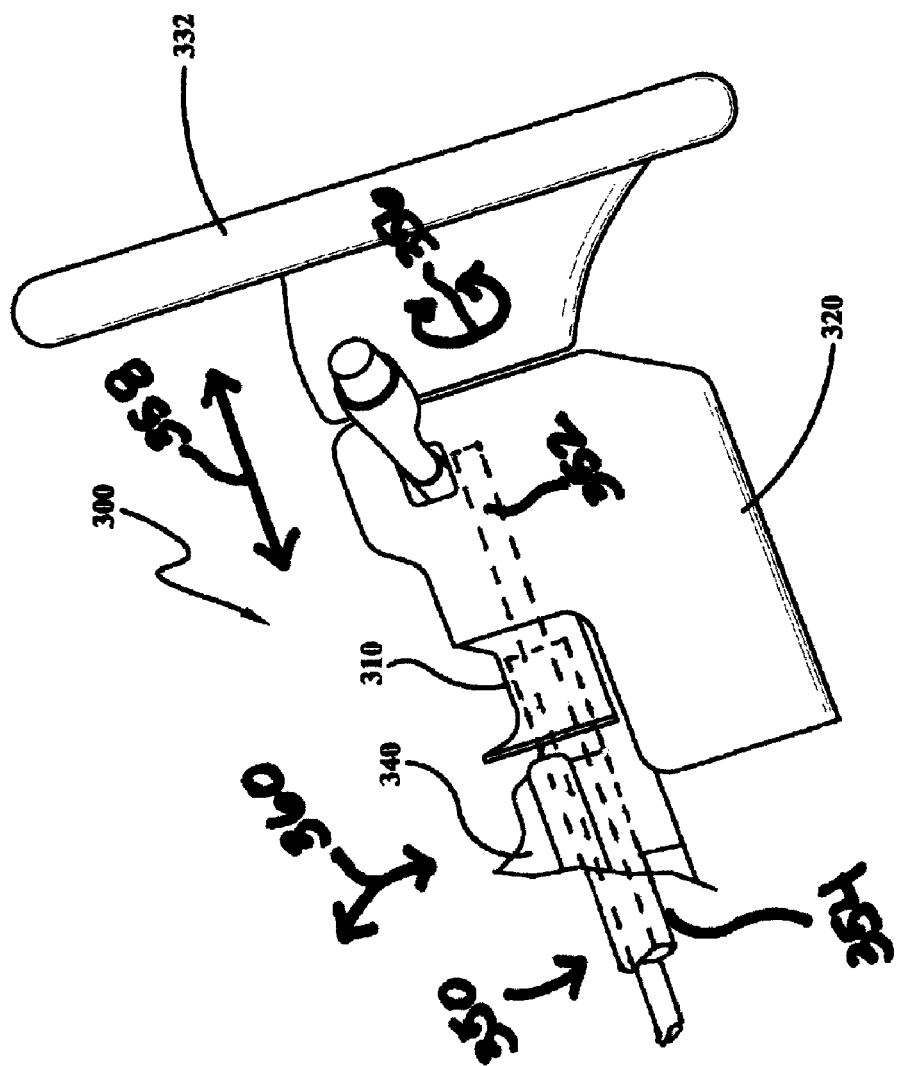
FIGS. 3a-3c are drawings of an embodiment installed on a steering column.
Figure 3A:
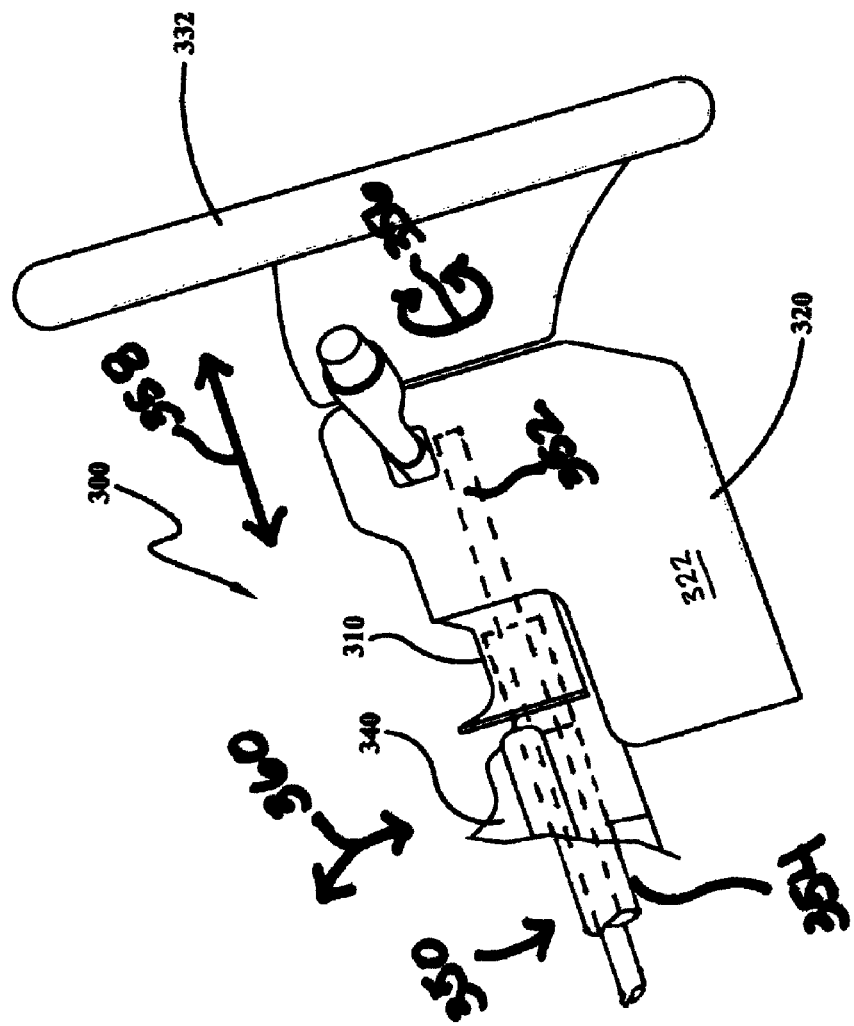
Figure 3C:
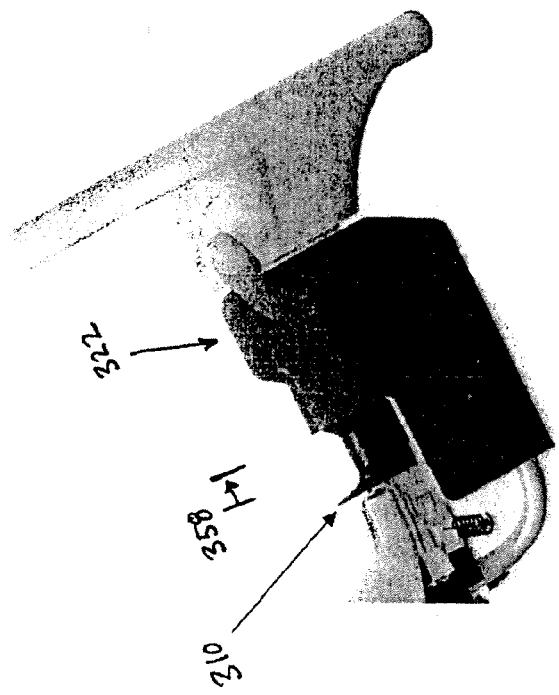
Figure 3B:
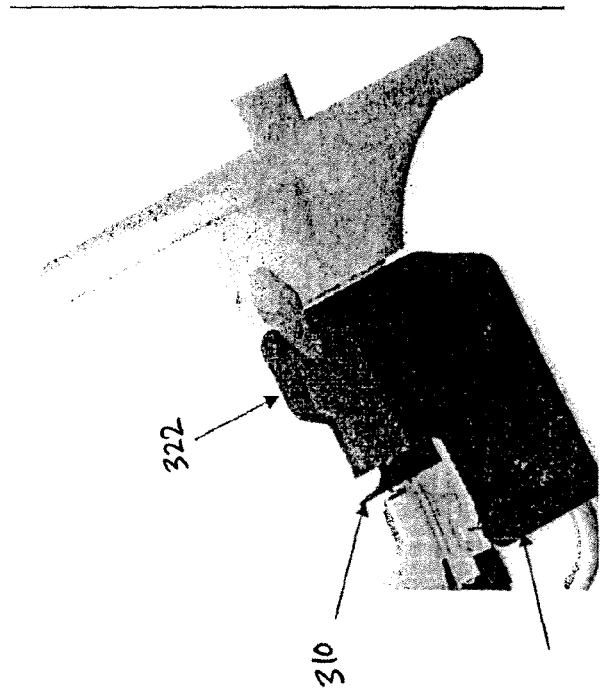

FIGS. 3a-3c show an embodiment 300 wherein a blind member 310 is mounted to a schematic steering column 350, and blocks various components 340 from the view of an occupant. The steering column 350 has a rotatable telescoping portion 352 and a non-rotatable non-telescoping portion 354. The rotation is indicated with reference 356 and the telescoping motion is indicated with reference 358. The embodiment 300 shows the blind member 310 as part of a steering column cover assembly 320. The steering column cover assembly 320 consists of a blind member 310 that is attached to the steering column 350, and a steering column cover 322 attached to the steering column. Importantly, the blind member 310 and steering column cover 322 are not attached to each other, and move independently of each other.

According to this embodiment, the blind member 310 does not rotate with the steering wheel 332, but instead remains stationary. Furthermore, the blind member 310 does not telescope with the steering wheel 332 when the wheel 332 is extended or retracted. However, when the wheel 332 is tilted upward or downward, as indicated with reference 360, the blind member does tilt with the wheel 330 and the steering column.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. An assembly comprising:
   a motor vehicle steering column that is tiltable and that comprises: a rotatable telescoping portion and a non-rotatable non-telescoping portion;
   a steering wheel attached to a distal end of the motor vehicle steering column;
   wherein the steering wheel is tiltable; rotatable; and, telescopically extendable;
   a motor vehicle steering column cover that covers at least a portion of the motor vehicle steering column;
   a motor vehicle steering column blind that: masks internal components of the motor vehicle steering column from the view of an associated occupant; is attached to the non-telescoping portion of the motor vehicle steering column; and, is not attached to the motor vehicle steering column cover; and,
   wherein the motor vehicle steering column blind: does not extend with the steering wheel; and, tilts with the steering wheel.

2. The assembly of claim 1 wherein:
   the motor vehicle steering column blind does not rotate with the steering wheel.

3. The assembly of claim 1 wherein the motor vehicle steering column cover covers at least a portion of the motor vehicle steering column blind.

4. The assembly of claim 3 wherein the motor vehicle steering column blind comprises:
   a shaft portion having a semi-circular cross section;
   a flared obstructing portion; and,
   a plurality of holes positioned on the shaft portion that receive associated fasteners to mount the motor vehicle steering column blind to the non-telescoping portion of the motor vehicle steering column.

5. The assembly of claim 3 wherein the motor vehicle steering column blind comprises:
   a shaft portion having a semi-circular cross section;
   a flanged obstructing portion; and,
   a plurality of holes positioned on the shaft portion that receive associated fasteners to mount the motor vehicle steering column blind to the non-telescoping portion of the motor vehicle steering column.

6. The assembly of claim 3 wherein the motor vehicle steering column blind comprises:
   a shaft portion having a semi-rectangular cross section;
   a flanged obstructing portion; and,
   a plurality of holes positioned on the shaft portion that receive associated fasteners to mount the motor vehicle steering column blind to the non-telescoping portion of the motor vehicle steering column.

7. The assembly of claim 3 wherein the motor vehicle steering column blind comprises:

a shaft portion having a semi-circular cross section and comprising: a relatively smaller shaft portion and a relatively larger shaft portion joined to the relatively smaller shaft portion by a conical region;
a flared obstructing portion; and,
a plurality of holes positioned on the shaft portion that receive associated fasteners to mount the motor vehicle steering column blind to the non-telescoping portion of the motor vehicle steering column.

8. The automotive assembly of claim 3 wherein the motor vehicle steering column blind has a plurality of clips that mount to the motor vehicle steering column.

9. An assembly comprising:
a motor vehicle steering column comprising: a telescoping portion; and, a non-telescoping portion;
a steering wheel attached to a distal the distal end of the motor vehicle steering column;
wherein the steering wheel is rotatable and telescopically extendable;
a motor vehicle steering column cover that covers at least a portion of the motor vehicle steering column;
a motor vehicle steering column blind that: masks internal components of the motor vehicle steering column from the view of an associated occupant; is attached to the non-telescoping portion of the motor vehicle steering column; and, is not attached to the motor vehicle steering column cover; and,
wherein the motor vehicle steering column blind does not extend with the steering wheel.

10. The assembly of claim 9 wherein:
the motor vehicle steering column comprises: a rotatable portion; and, a non-rotatable portion; and,
the motor vehicle steering column blind is attached to the non-rotatable portion of the motor vehicle steering column and does not rotate with the steering wheel.

11. The assembly of claim 9 wherein the motor vehicle steering column cover covers at least a portion of the motor vehicle steering column blind.

12. The assembly of claim 9 wherein the motor vehicle steering column blind comprises:
a shaft portion having a semi-circular cross section;
a flared obstructing portion; and,
a plurality of holes positioned on the shaft portion that receive associated fasteners to mount the motor vehicle steering column blind to the non-telescoping portion of the motor vehicle steering column.

13. The assembly of claim 9 wherein the motor vehicle steering column blind comprises:
a shaft portion having a semi-circular cross section;
a flanged obstructing portion; and,
a plurality of holes positioned on the shaft portion that receive associated fasteners to mount the motor vehicle steering column blind to the non-telescoping portion of the motor vehicle steering column.

14. The assembly of claim 9 wherein the motor vehicle steering column blind comprises:
a shaft portion having a semi-rectangular cross section;
a flanged obstructing portion; and,
a plurality of holes positioned on the shaft portion that receive associated fasteners to mount the motor vehicle steering column blind to the non-telescoping portion of the motor vehicle steering column.

15. The assembly of claim 9 wherein the motor vehicle steering column blind comprises:
a shaft portion having a semi-circular cross section and comprising: a relatively smaller shaft portion and a relatively larger shaft portion joined to the relatively smaller shaft portion by a conical region;
a flared obstructing portion; and,
a plurality of holes positioned on the shaft portion that receive associated fasteners to mount the motor vehicle steering column blind to the non-telescoping portion of the motor vehicle steering column.

16. The automotive assembly of claim 9 wherein the motor vehicle steering column blind has a plurality of clips that mount to the motor vehicle steering column.

* * * * *

UNITED STATES PATENT AND TRADEMARK OFFICE
CERTIFICATE OF CORRECTION

| | | |
|---|---|---|
| PATENT NO. | : 8,313,120 B2 | Page 1 of 1 |
| APPLICATION NO. | : 11/962814 | |
| DATED | : November 20, 2012 | |
| INVENTOR(S) | : Ron Myers | |

It is certified that error appears in the above-identified patent and that said Letters Patent is hereby corrected as shown below:

On the Title Page item (12) of U.S. Patent No. 8,313,120, delete "United States Patent Meyers" and insert --United States Patent Myers--.

On the Title Page item (75) Inventor of U.S. Patent No. 8,313,120, delete "Ron Meyers, Raymond, OH (US)" and insert --Ron Myers, Raymond, OH (US)--.

Signed and Sealed this
Thirtieth Day of September, 2014

Michelle K. Lee
*Deputy Director of the United States Patent and Trademark Office*